N. MADSEN.
MOWING MACHINE.
APPLICATION FILED NOV. 1, 1910.
1,041,312.
Patented Oct. 15, 1912.
3 SHEETS—SHEET 3.
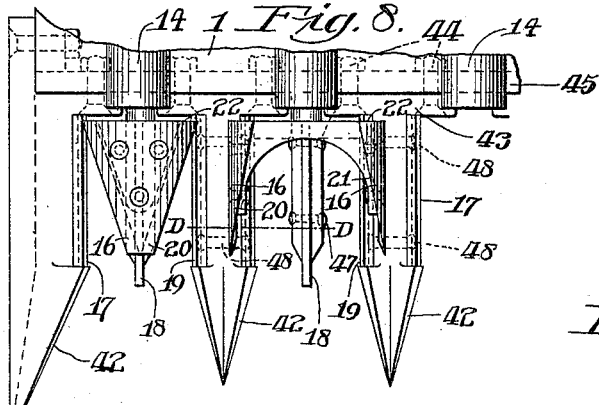
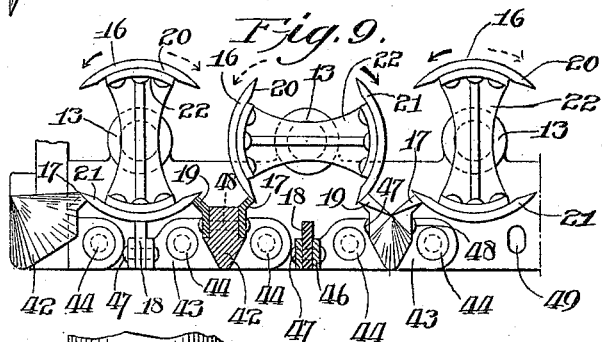
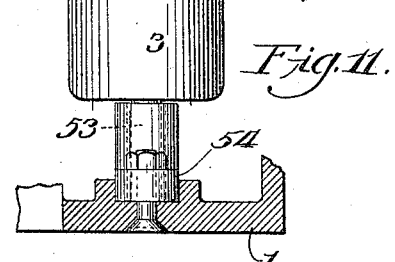
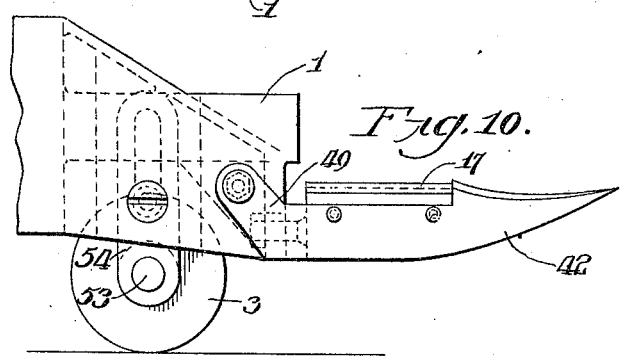
INVENTOR
Nils Madsen
BY Chas. A. Cutter.
ATTORNEY
WITNESSES
COLUMBIA PLANOGRAPH CO., WASHINGTON, D. C.

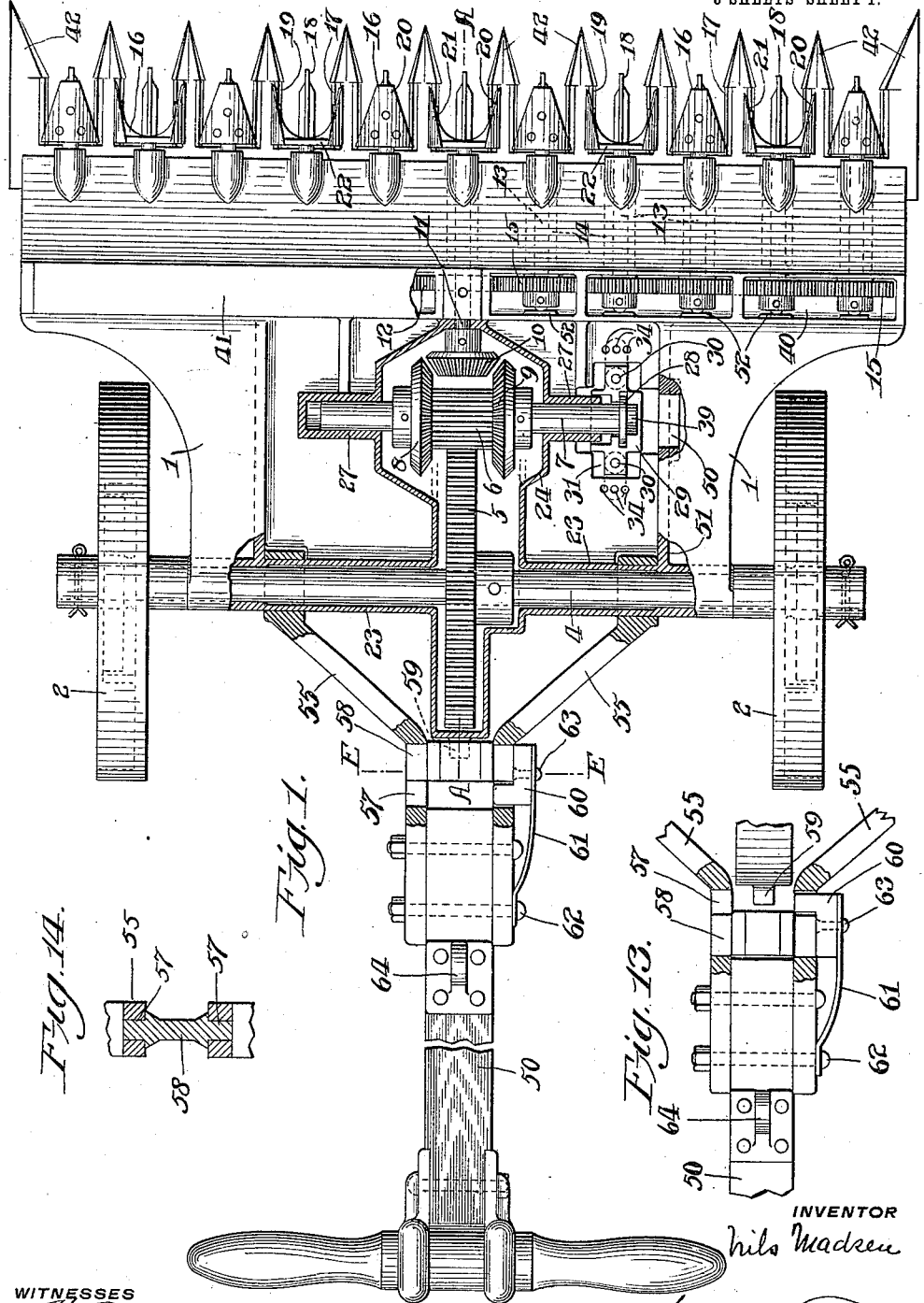

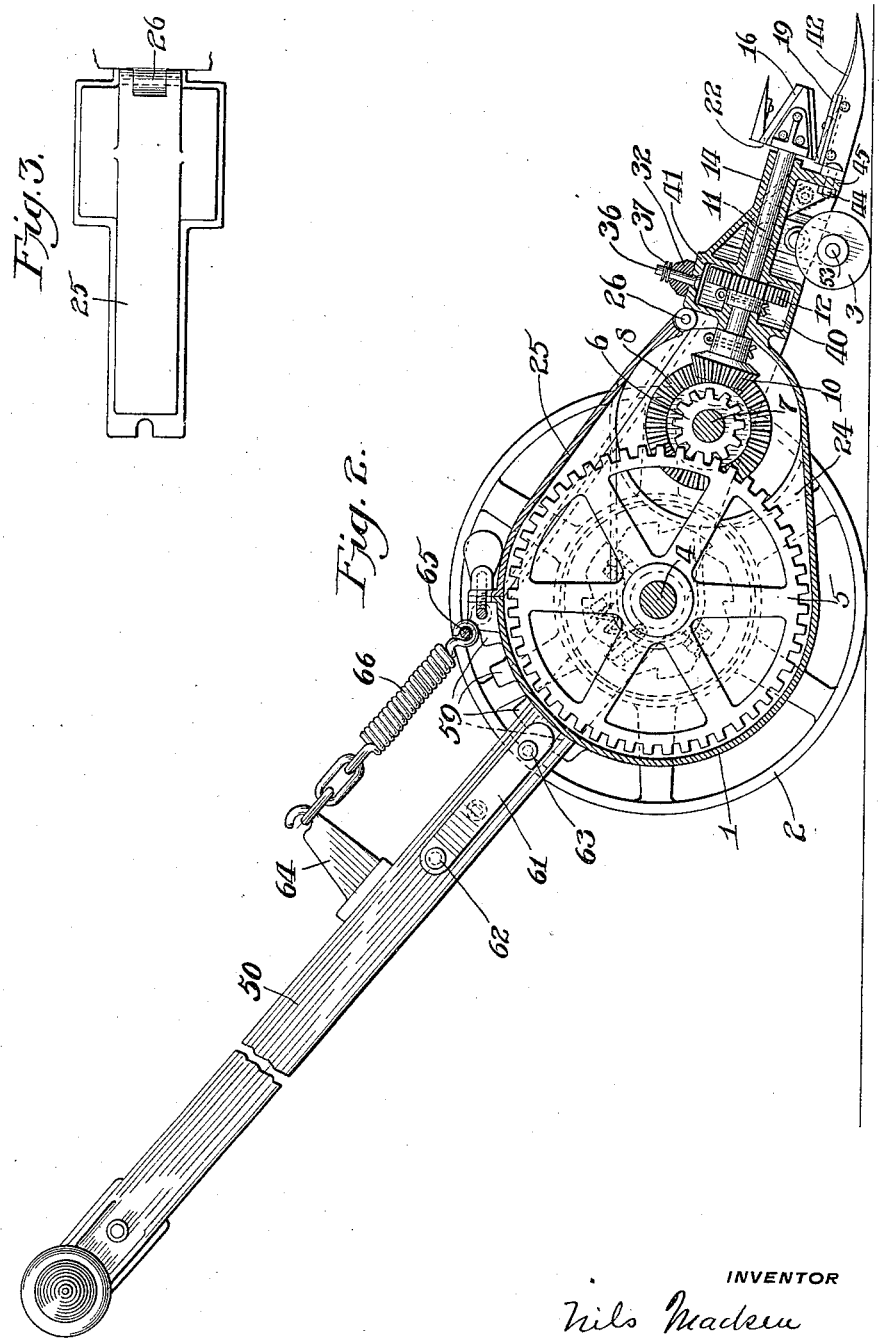

UNITED STATES PATENT OFFICE.

NILS MADSEN, OF WESTVILLE, NEW JERSEY.

MOWING-MACHINE.

1,041,312. Specification of Letters Patent. Patented Oct. 15, 1912.

Application filed November 1, 1910. Serial No. 590,168.

*To all whom it may concern:*

Be it known that I, NILS MADSEN, a subject of the King of Norway, and a resident of Westville, in the county of Gloucester, State of New Jersey, have invented certain new and useful Improvements in Mowing-Machines, of which the following is a specification.

My invention relates to improvements in mowing machines and while certain features of my invention are applicable to mowing machines in general my invention relates more particularly to improvements in hand operated, or lawn, mowing machines.

Briefly stated the objects of my invention are, 1st, to furnish a mowing machine which can be operated with a minimum expenditure of power; 2nd, to furnish a machine which will cut grass evenly and cleanly; 3rd, to furnish a mowing machine which will cut directly up to a tree, a fence, or other obstruction, and to this end the wheels upon which the machine is carried are placed within the frame and at a distance apart less than the cutting face of the machine; 4th, to furnish a series of revolving knives, operating in connection with suitable stationary knives, with four cutting edges two of which will be operative upon a revolution of the knives in one direction and the other two of which will be operative upon a revolution of the knives in the opposite direction; 5th, to furnish a convenient means whereby the direction of rotation of the revolving knives may be reversed; 6th, to furnish certain other improvements which will be hereinafter fully described.

In the accompanying drawings forming part of this specification and in which similar letters of reference indicate similar parts throughout the several views: Figure 1 is a plan, partly in section, of my improved mowing machine; Fig. 2, a section of Fig. 1 on line A—A; Fig. 3, a plan of cover for closing the top of gear casing in the main frame; Fig. 4, a plan of the device for shifting, locking, and taking the thrust of the shaft upon which the combined spur and bevel gears which drive the gearing operating the revolving knives are carried; Fig. 5, a section of Fig. 4 on line B—B; Fig. 6, a plan of part of cover for closing the top of case in which spur gears connecting the several shafts of the cutting knives are placed; Fig. 7, a section of Fig. 6 on line C—C; Fig. 8, a plan, on an enlarged scale, of several of the cutters and fingers; Fig. 9, a section through Fig. 8 on line D—D; Fig. 10, a side elevation of Fig. 9 showing wooden roller. Fig. 11, a plan of part of wooden roller showing, in section, the guides for supporting its bearings; Fig. 12, a side elevation of one of the finger bars and its support. Fig. 13, a view of part of push bar, similar to that shown in Fig. 1, the tongue piece being moved out of engagement with teeth on main frame; Fig. 14, a section through push bar on line E—E Fig. 1.

1 is the frame of the machine, 2 the main or driving wheels, 3 the roller, at the forward end of the machine for gaging the height of knives above ground, 4 the main shaft of the machine which is shorter than the width of the frame 1, 5 a gear wheel fast to and turning with shaft 4, 6 a pinion carried upon a shaft 7 journaled in bearings in frame 1; 8 and 9 bevel gears facing each other and former, preferably, integrally with pinion 6.

10 is a bevel gear carried upon a shaft 11 which carries a pinion 12, 13 are shafts, carried in bearings 14, the rear ends of which carry pinions 15 which gear with one another forming a train of gears which is driven through the pinion 12. 16 are rotating knives carried upon the outer ends of shafts 13. 17—18—19 are stationary knives between which and the revolving knives the grass is cut.

The revolving knives 16 are formed each of two blades, 20—21 each having a curved triangular shape as shown; they are bolted or riveted to heads 22 which are carried upon the outer ends of the shafts 13 to which the pinions 12 are fast.

The main driving wheels 2 turn freely on the shaft 4 on a backward movement of the machine and are locked to this shaft upon a forward movement by means of the usual pawl and ratchet, shown in dotted lines in Figs. 1 and 2. This arrangement is so well known that it will not need detailed description.

The main shaft 4 is carried in a tubular casing, or bearing 23 carried by or forming part of the frame 1 and the gear 5, the pinion 6 and bevel gears 8, 9 and 10 are carried in a casing 24, which can be filled with oil or grease, and which can be made tight by a cover 25, Figs. 2 and 3, which is preferably hinged at 26 to the casing 24.

The shaft 7 carries a thrust collar 28 which revolves in a bearing formed in the two plates 29, the separate parts of which are held together by bolts 30, Fig. 5, and this shaft is carried in bearings 27 forming part of or carried by the casing 24 or main frame. The plates 29 are placed in an opening 31, Fig. 1, formed in frame 1 of the machine, the ends of these plates, as shown in Fig. 5, passing over the sides of the opening.

32 is an operating knob which carries pins 33, one upon each side which are adapted to pass through either one of the three holes 35 in the plate 29.

36 is a pin secured to the upper part of two-part plate 29 the upper end of which carries a stop 37 and which is surrounded by a spring 38, Fig. 5, which bears against stop 37 and knob 32. By lifting knob 32 so that pins 33 are clear of the hole 34 in plate or frame 1 the knob, the two plates 29, the shaft 7 and the gears 6, 8 and 9 may be moved to the left to cause bevel gear 10 to engage bevel gear 9 to cause shaft 11 to rotate in one direction or to the right to cause bevel gear 10 to engage bevel gear 8 to rotate shaft 11 in the opposite direction. The knob 32 being attached to the plates 29 through the collar 28 a movement of the knob longitudinally of the shaft 7 will cause a corresponding movement of the shaft. The knob having been moved to cause shaft 7 to bring the desired bevel gear 8 or 9 into engagement with bevel gear 10 or to a neutral position, as shown in Fig. 1, when both gears 8 and 9 are out of engagement with gear 10, the knob is dropped and the pins 33 carried thereby enter the corresponding hole 34 in the frame 1 and hold the knob, the shaft 7 and connected parts firmly in the desired position.

50, Fig. 1, is a hole in the web 51 of frame 1 which permits the removal of shaft 7 from its bearings 27. This hole is sufficiently large for the passage of the thrust collar 28 which is fast to shaft 7. To remove shaft 7 from its bearings the two plates 29 are separated and removed and the fastenings securing pinion 6 and bevel gears 8—9 to the shaft are loosened when the shaft may be slid out through hole 50.

39, Fig. 1, is a space at end of thrust collar 28 for holding oil. As has been before stated, the shaft 11 which carries bevel gear 10 carries a pinion 12, Figs. 1 and 2, which gears, upon opposite sides, with pinions 15 the shafts 13 of which are carried in bearings 14 similar to the bearings of the shaft 11. To the right and left of the shafts 13 are as many other similar shafts as may be desired. Each of these shafts is furnished with a driving pinion 15 meshing with that of its neighbor, adjacent shafts will, therefore, revolve in opposite directions as will, of course, the cutters carried by these shafts. At their inner ends the shafts 13 are rounded and rest against abutments 52 carried by or forming part of the frames 1. This arrangement takes up the thrust of the shafts 13 and insures the knives 16 against being pushed too far backward.

The train of pinions 15 are carried in a case 40 the top of which is closed by a removable cover 41, Figs. 1, 2, 6, and 7, and this case can contain oil or grease for lubricating the several working parts carried by or connected with it.

At their outer ends the shaft 11 and the shafts 13 carry heads 22 to which are fastened the rotary knives 16. These knives are made of thin sheets of steel having in side elevation a triangular shape shown in Figs. 1, 2 and 8, and in end elevation a curved shape as shown in Fig. 9. Each head 22 carries two blades 16 and the sides of each blade are sharpened, as shown, to a cutting edge. If the blades be revolved in one direction the cutting edges upon one of their sides will be operative, if revolved in the opposite direction the opposite cutting edges will be operative.

For each set of revolving knives there are three stationary blades 17, 18, 19, the first and last being attached directly to the guard fingers 42, the central one, 18, being placed midway between the first and last as shown best in Figs. 8 and 9.

The guard fingers are furnished with flanged feet 43 through which, and the finger bar 45, pass bolts 44. The stationary knives 18 are carried by flanges 46 forming part of the feet 43 of the finger bars and are secured thereto by rivets 47 as shown in Fig. 9.

The stationary knives 17—19 are secured to the finger guards 42 by rivets 48 and the working faces of these knives are inclined at a suitable angle to the centers of the rotating knives as shown in Fig. 9.

The holes 49 in the finger bar 45 through which the bolts 44 pass are oblong, as shown in Figs. 9 and 12, so that the stationary knives may be moved to or from the rotating knives for purposes of adjustment.

The knives upon each rotating head have four cutting edges two of which are operative upon a rotation of the head in one direction and two of which are operative upon the rotation of the head in the opposite direction.

The distance of the knives 16 from the ground is regulated by the roller 3 which is placed at the forward end of the machine and directly back of the finger bar. The roller 3 is carried upon a shaft or gudgeons 53 which is carried in bearings in a bracket 54 which is adjustably carried by the frame 1 in any well known manner.

The push bar 50 is of the usual type, it is connected to the machine through arms 55 which are pivotally carried by the casing 23 of the shaft 4, hence the push bar is movable in a vertical plane around the casing 23 as a center. Suitable means are employed for locking the push bar to the frame of the machine and the means that I prefer for this purpose are as follows: The arms 55 are slotted, as at 57, and in these slots, extending across from one arm to the other, is a sliding tongue piece 58 which, when down, enters between two of the teeth 59, Fig. 2, carried by the frame 1 of the machine, to lock the push bar to the frame—as there are several teeth 59 the height of the outer end of the push bar may be easily adjusted to suit the wishes of the operator.

The tongue piece 58 is held in operative or inoperative position in relation to the teeth 59 by means of a stop 60 which is carried by the free end of a spring 61 the other end of which is secured to one of the arms 55 by a bolt or rivet 62. The stop 60 is secured to the spring 61 by a pivot 63 around which it can turn.

In Fig. 1 the tongue piece 58 is shown in its lowered position, that is between two of the teeth 59 and the stop 6 engages its top and prevents it leaving this position. If the lower, or free, end of spring 61 be drawn outward until stop 60 is clear of the end of the tongue piece 58 this latter may be slid up in the slots 57 and if the stop 60 be turned 180 degrees upon the pivot 63 the step will engage the bottom of the tongue piece and hold it clear of the teeth 59. This latter position is shown in Fig. 13. Fig. 14 shows a section through the arms 55 and the tongue piece 57 on line E—E Fig. 1.

64, Figs. 1 and 2, is a hook attached to push bar 50 and 65, Fig. 2, a hook or shackle carried by frame 1, 66 is a spring joining hooks 64 and 65. If the tongue 58 be held out of engagement with teeth 59 and the spring be joining hooks 64—65 the push bar will be supported in a raised position by the spring which makes a flexible connection between the push bar and the cutting end of the machine which is very often desirable.

Having thus described my invention I claim as new and desire to secure by Letters Patent:

1. In a mowing machine, in combination, a frame, a main shaft, a plurality of shafts carried by said frame and extending at right angles to the main shaft, heads at the forward ends of said shafts, substantially triangular cutters curved in cross section carried by said heads, intermeshing pinions carried by said shafts, finger bars carried by said frame, stationary knives carried by said finger bars, wheels carried by said main shaft, and a train of gearing operated by said shaft for operating the pinions upon the shafts of the rotating knives.

2. In a mowing machine, in combination, a frame, a main shaft of less length than the width of said frame, wheels carrying said shaft, a plurality of revolving and a plurality of stationary knives, the former revolving at right angles to the direction of motion of the machine, shafts carrying said revolving knives, intermeshing pinions carried by and connecting said shafts means driven from the main shaft for driving said pinions, and means by which the direction of motion of said cutters may be reversed.

3. In a mowing machine, in combination, a frame, a shaft carried by said frame, wheels on said shaft, a gear wheel turning with said shaft, a pinion wider than said gear wheel gearing with the same, bevel gears facing each other and secured to opposite sides of said pinion, a sliding shaft carrying said pinion and bevel gears, means for sliding and means for locking said shaft, a bevel gear between and adapted to engage either one of said bevel gears, a shaft carrying said latter bevel gear, a driving pinion on said shaft, a train of pinions adapted to be driven by said driving pinion, shafts carrying said pinions, a pair of rotating substantially triangular blades curved in cross-section each having double cutting edges carried by each of said shafts, and stationary knives and finger bars carried by said frame.

4. A cutter for a mowing machine consisting of a shaft, a head carried by said shaft, a pair of oppositely placed substantially triangular blades curved in cross-section secured to said head and sharpened on both free edges and revolving at right angles to the direction of the travel of the machine and stationary blades between which and the revolving blades the grass is cut.

5. The combination in a mowing machine, of a cutter comprising a rotating shaft, a pair of substantially triangular blades curved in cross-section carried by said shaft and sharpened upon both edges, means for carrying and means for rotating said shaft in either direction, and three stationary blades the central one of which is operative upon a movement of said rotary cutter in either direction and the side ones of which are operative, the one, upon a rotation of said rotary cutter in one direction, the other upon a rotation of said cutter in the opposing direction.

6. In a mowing machine, in combination, a plurality of rotary cutters, consisting each of a pair of substantially triangular blades curved in cross section, means for carrying and means for rotating said cutters in either direction, fingers between and projecting forward of said cutters, and stationary blades carried by said fingers and means for adjustably carrying said fingers and blades relatively to said cutters.

7. In a mowing machine, in combination a plurality of rotary cutters, consisting each of a pair of substantially triangular blades curved in cross-section, means for carrying and means for rotating said cutters in either direction, a finger bar furnished with oblong slots, fingers furnished with a perforated foot, bolts adapted to pass through the perforations in said foot and the oblong slots in said finger bar, and stationary blades carried by said fingers.

8. In a mowing machine, in combination, a case, a frame carrying said case, a main shaft carried in bearings forming part of said case, driving wheels carried on said shaft, a gear wheel carried on said shaft, a pinion gearing with said gear wheel, bevel gears secured to or forming part of said pinion, a shaft slidingly carried in bearings forming part of said case to which said bevel gears and pinion are secured, a thrust collar on said shaft, plates in which said thrust collar turns, an operating knob carried by said plates and vertically movable thereon, pins carried by said knob adapted to pass through holes in said plates and frame to lock the former to the latter, a bevel gear adapted to be operated by either one of the bevel gears secured to said pinion, a plurality of rotating and stationary cutters, and connections between said rotating cutters and said driving wheels.

NILS MADSEN.

Witnesses:
 GEO. H. HILL, Jr.,
 CHARLES A. RUTTER.

---

Copies of this patent may be obtained for five cents each, by addressing the "Commissioner of Patents, Washington, D. C."